United States Patent [19]
Chapman et al.

[11] Patent Number: 6,053,210
[45] Date of Patent: *Apr. 25, 2000

[54] EXPANDABLE PLUG AND CONTROL METHOD

[75] Inventors: Peter Glanville Chapman, Greenwich; Allan Kenneth Wallace, Tranmere; Leslie Herbert Cowling, Burton Park, all of Australia

[73] Assignees: Vinidex Tubemakers Pty. Limited, Australia; Uponor B.V., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/666,590

[22] PCT Filed: Dec. 21, 1994

[86] PCT No.: PCT/AU94/00784

§ 371 Date: Aug. 14, 1996

§ 102(e) Date: Aug. 14, 1996

[87] PCT Pub. No.: WO95/17642

PCT Pub. Date: Jun. 29, 1995

[30] Foreign Application Priority Data

Dec. 21, 1993 [AU] Australia ............... PM 3076

[51] Int. Cl.[7] ................................ F15D 1/02
[52] U.S. Cl. ................ 138/46; 138/93; 138/123
[58] Field of Search ............. 138/93, 89, 123, 138/46

[56] References Cited

U.S. PATENT DOCUMENTS

| | | | |
|---|---|---|---|
| 2,238,058 | 4/1941 | Johnson et al. | 138/123 |
| 2,794,197 | 6/1957 | Crane | 15/104.06 |
| 3,459,230 | 8/1969 | Smith | 138/93 |
| 4,079,755 | 3/1978 | Van der Lans | 138/93 |
| 4,413,653 | 11/1983 | Carter, Jr. | 138/89 |
| 4,423,754 | 1/1984 | Carter, Jr. | 138/93 |
| 4,467,835 | 8/1984 | Champleboux | 138/93 |
| 4,614,206 | 9/1986 | Mathison et al. | 138/93 |
| 4,883,094 | 11/1989 | Vetter | 138/89 |

FOREIGN PATENT DOCUMENTS

| 8111987 | 12/1982 | France . |
|---|---|---|
| 1066281 | 3/1978 | Russian Federation . |

*Primary Examiner*—James Hook
*Attorney, Agent, or Firm*—Hayes, Soloway, Hennessey, Grossman & Hage, P.C.

[57] ABSTRACT

The invention provides, in a first form, an expandable plug for regulating pressure or flow within a tube. The plug has an inflatable bladder (12) for diametral expansion by internal fluid pressure introduced by inlet (14). The plug is reinforced by an envelope (26) of cords (28) which spread laterally upon inflation of the bladder to provide diametral support to the bladder. In a second form of the invention, an inflatable plug positioned in a tube of internal diameter d is controlled according to the equation $P_p = \Delta P + P_d$ wherein $P_d$ is the internal pressure in the plug, $\Delta P$ is the differential pressure across the plug and $P_d$ is the plug free expansion pressure for diameter d.

47 Claims, 3 Drawing Sheets

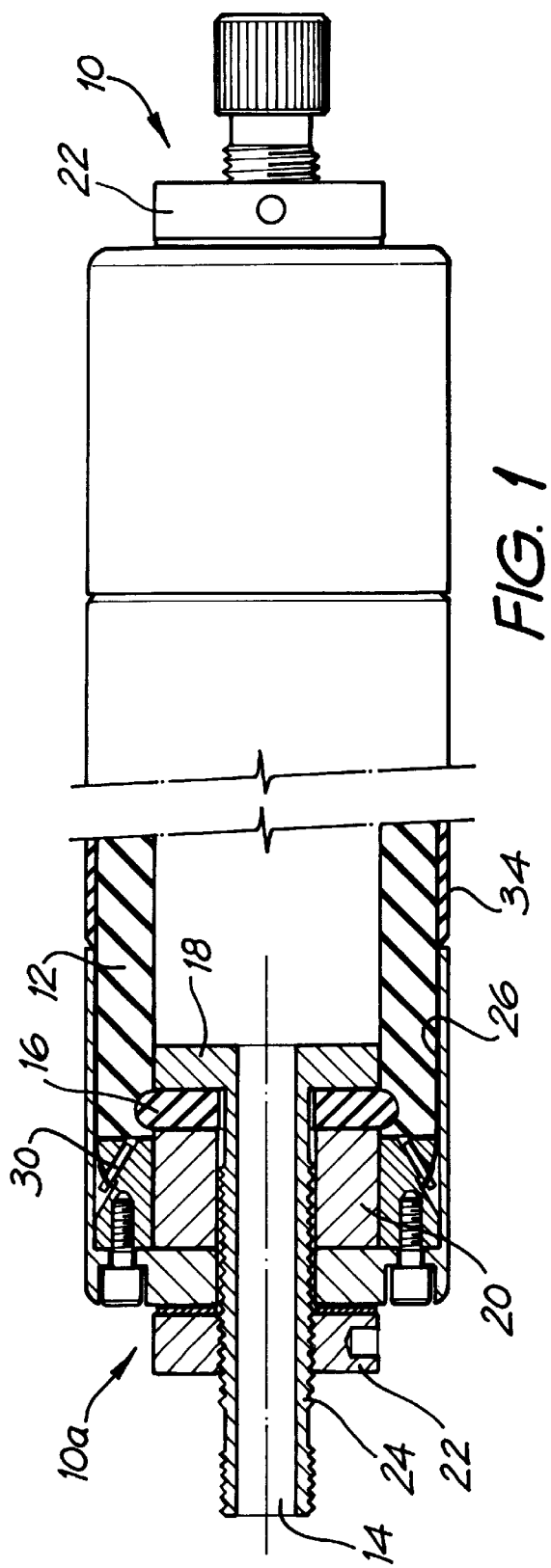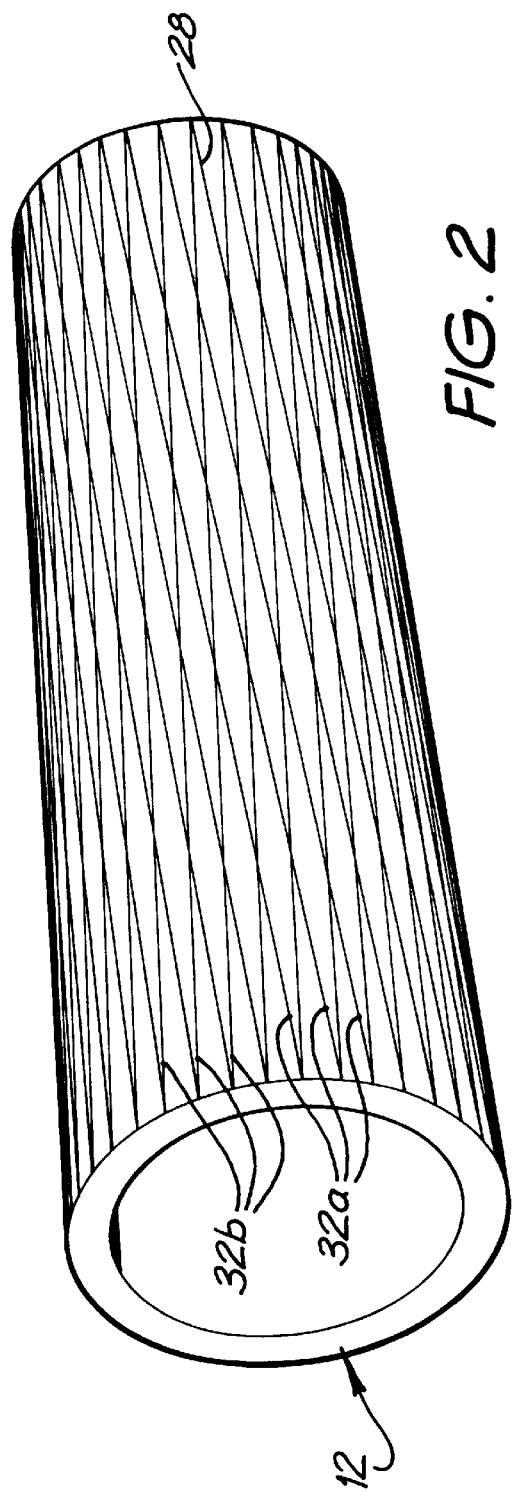

EXPANDABLE PLUG AND CONTROL METHOD

BACKGROUND OF INVENTION

The present invention relates to an expandable plug adapted to seal or to regulate pressure or flow within a tube, and also to a method of control.

Expandable plugs of this general type find application in cases where normal valving of flow is inappropriate for some reason, for example because the position of the desired seal or regulation is not fixed with respect to the tube, the desired seal is temporary, or the exterior of the tube is inaccessible.

The general approach to the design and construction of expandable plugs involves the use of an elastomeric cylinder or bladder, which is caused to increase in diameter. This may be done by a variety of mechanical means, or by application of internal pressure.

In use the plug will need to withstand diametral expansion and axial thrust, the latter being due to friction (in cases where the plug moves relative to the tube) and the differential tube fluid pressure across the plug.

Mechanically expanded plugs are suitable only for relatively small ratios of expansion and/or low axial thrusts. Larger expansion ratios may be required in cases for example where undue hydraulic obstruction of the tube cannot be tolerated when the plug is not expanded, or where the tube may vary in diameter or be caused to expand by fluid pressure behind the plug. For such applications, expansion by internal pressure is preferred.

SUMMARY OF INVENTION

The present invention relates, in its first form, to an expandable plug of the inflatable type, and aims to provide a plug construction which does not require excessive pressure for inflation, yet is capable of withstanding substantial axial thrusts.

This first aspect of the invention provides an inflatable plug comprising an inflatable bladder adapted for diametral expansion by application of internal fluid pressure, fluid inlet means communicating with the interior of the bladder for connection to a source of inflating fluid and reinforcement means including flexible reinforcing cords which provide axial reinforcement to the plug and diametral support to the bladder, said cords each spreading laterally on inflation of the bladder. The cords are preferably formed of a plurality of strands which are not twisted together, thus allowing the strands of each cord to spread out laterally as the bladder is inflated.

The cords preferably extend between the opposite axial ends of the bladder to form an envelope surrounding the outer surface of the bladder, offering little or no resistance to diametral expansion of the bladder.

A second aspect of the invention relates to a method for controlling the inflation of an expandable plug in a tube so as to control the pressure differential in the tube, or so as to allow leakage of fluid past the plug, by controlling the internal pressure in the plug according to the equation.

$$P_p = \Delta P + P_d$$

where $P_p$=Pressure applied to plug $\Delta P$=Pressure differential across plug $P_d$=Pressure to expand plug to diameter d without confinement (free expansion pressure)

d=diameter of confining tube

BRIEF DESCRIPTION OF THE DRAWINGS

Further preferred embodiments of the invention shall now be described with reference to the accompanying drawings, in which:

FIG. 1 is a schematic side view, partly in cross section, of a preferred plug construction;

FIG. 2 is a perspective view of a portion of the bladder with the sheath removed to reveal the helical reinforcing cord arrangement;

DESCRIPTION OF THE PREFERRED EMBODIMENTS

Figure 3:
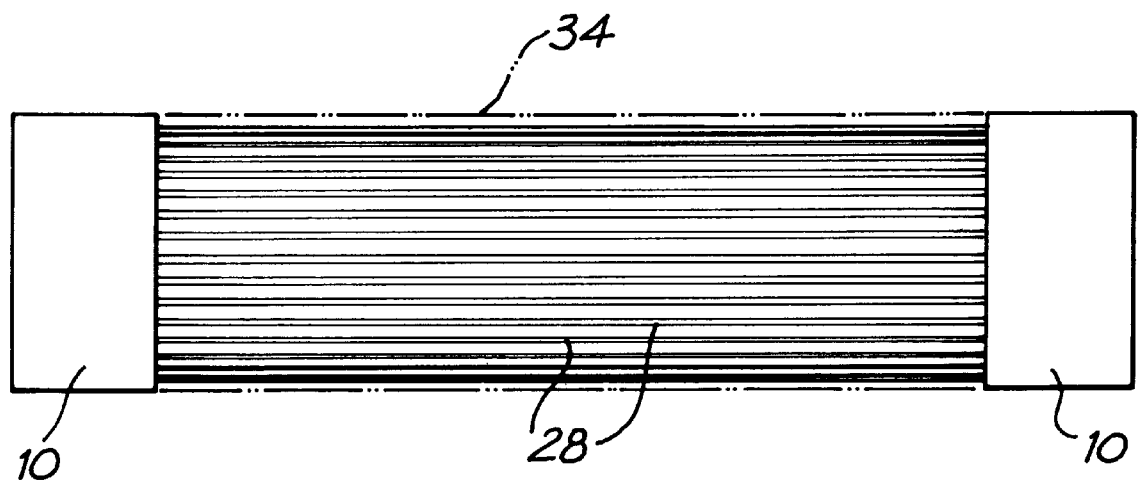
FIGS. 3 and 4 schematically illustrate the spreading of the cords as the plug is inflated.

The plug generally consists of a pair of end cap members 10 between which a cylindrical bladder 12 extends. The upstream end cap member 10a has a fluid inlet 14 for entry of liquid or gas to inflate the bladder. In practice, the end caps may be identical and the downstream end cap blocked off or restricted to provide back pressure. At least one of the end caps is physically connected to an external support to provide reactive support against axial thrust on the plug. This support may conveniently be provided by the pipe (not shown) which provides the inflation fluid.

The bladder 12 should be formed of a tube of elastomeric material with a high strain capability and low stiffness, in order to accept diametral expansion without rupture. This is particularly important where a high expansion ratio is required.

The elastomeric bladder is fixed to the end caps by compression seals 16 or other suitable means. Each seal is compressed between a compression flange 18 and a spacer block 20 as nut 22 on the shaft 24 of the compression flange is tightened.

The reinforcing envelope 26 is formed of flexible cords 28 which surround the outer surface of the bladder, the cords being better shown in FIG. 2. The cord may be fixed by winding about a series of angled anchor pins 30 (shown in FIG. 1) attached to each end cap. The cords, of non-elastomeric material, encase the bladder, offering little or no resistance to diametral expansion. It will be appreciated that the gap between the cords will tend to increase as the plug circumference expands. Within this gap the elastomeric bladder is unsupported, and therefore numerous, closely positioned cords should be used. The cords may be protected by a second elastomeric sheath 34 over the outside of the plug if necessary.

In the embodiment of FIG. 2, the cords are laid at a small helix angle, for example less than 15°, to the axis of the plug, with two or more layers 32a, 32b of cords with opposing helices. This assists in the positioning of the cords during expansion, although at the cost of a slight increase in diametral resistance due to the circumferential component of the cord direction.

Most commercially available reinforcing cord is made by twisting together a large number of individual strands. The twist prevents spreading of the cord and provides greater resilience. However, the Applicant has found that in this particular application the normal twisted cord is undesirable, as the cords cause intense local stresses in the elastomer and tend to cut the bladder. The Applicant has found that by using untwisted cord the strands move laterally over the expanding surface of the bladder, spreading the load and thus preventing cutting of the bladder.

Figure 4:
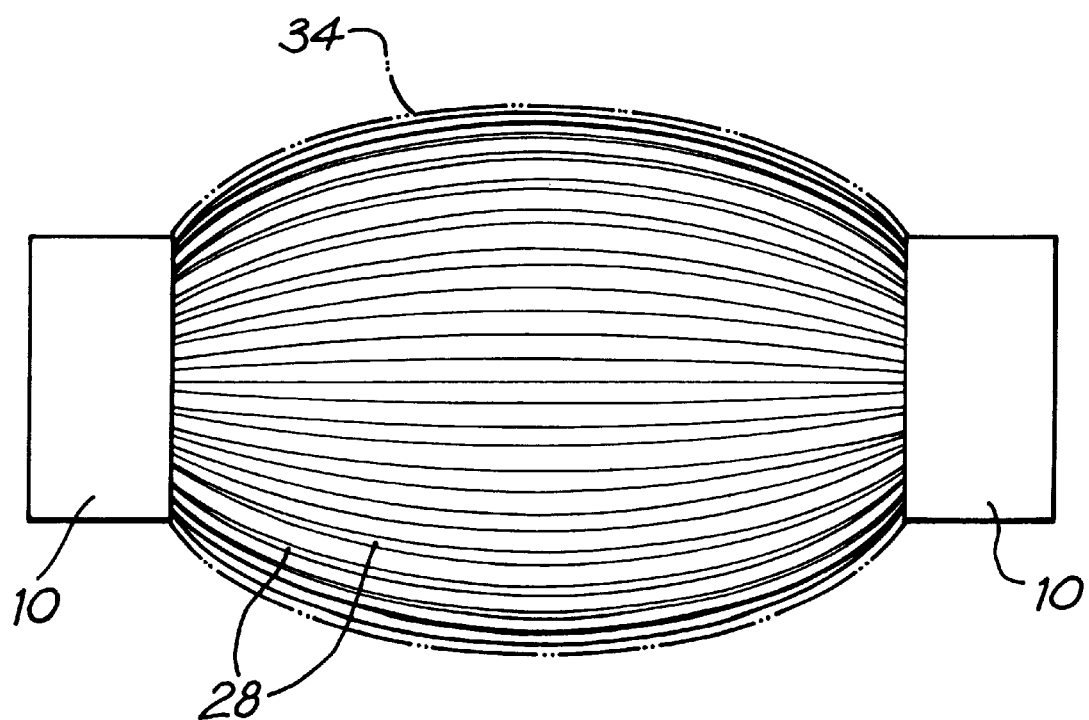

FIGS. 3 and 4 illustrate this lateral movement of the strands during inflation. FIG. 3 shows a parallel cord configuration of an uninflated plug. FIG. 4 shows the same plug when inflated. It can be seen that the width of the untwisted cords increases as the bladder expands. For the sake of clarity, FIGS. 3 and 4 show the cords widely separated. In practice, the cords are preferably more tightly packed with little or no gap.

In principle the cords can be of any material with appropriate characteristics, in general high tensile strength, high elastic modulus, high flexibility, and suitable chemical compatibility with the fluid involved. Cotton, metal, or synthetic fibre cords could be used. Very successful plugs have been constructed using aramid cords, which consist of a very large number of very fine strands, and can be obtained in untwisted form.

It is important in the construction of the plug that the cords be all equal in tension and length. One cord slightly looser than others will be displaced on expansion and leave an unsupported gap on the elastomeric bladder. A method by which equal tension may be achieved is to fix cord anchor rings on an appropriate rigid frame, and wind the cords using a counter weight to ensure constant tension.

In an alternative embodiment, the reinforcing envelope may be integrally formed with the elastomeric material of the bladder or sheath. The use of the untwisted cords allows lateral movement of the strands, reducing the tendency of the cords to tear the elastomer matrix of the composite material during expansion.

The construction according to the invention provides a plug with highly anisotropic properties, namely:

1. the ability to accept diametral expansion without rupture and without requiring excessive pressure, that is, a high strain capability in the circumferential direction and a low stiffness; and
2. the ability to carry axial loading resulting from the pressure differential across the plug, that is, very high strength and high stiffness in the axial direction.

The diametral expansion properties of the plug result in a relatively low free expansion pressure, that is, the pressure needed to expand the plug to the tube diameter without confinement. This allows fine control of the plug inflation pressure, thus allowing control of the upstream pressure or flow in the tube as described below.

Surprisingly, the Applicant has found that a precise and predictable relationship exists between the pressure applied internally to an expandable plug and the pressure which may be retained behind the plug, as described in the following equation:

$$P_p = \Delta P + P_d$$

where $P_p$=Pressure applied to plug $\Delta P$=Pressure differential across plug $P_d$=Pressure to expand plug to diameter d without confinement (free expansion pressure)

d=diameter of confining tube

Figure 5:
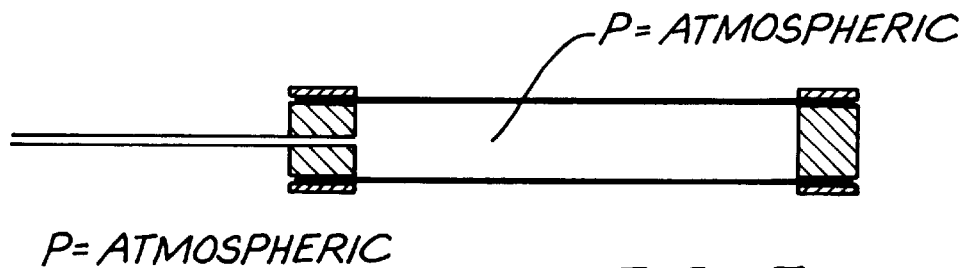
FIGS. 5 to 7 are schematic view illustrating the control method according to the second aspect of the invention.
Figure 6:
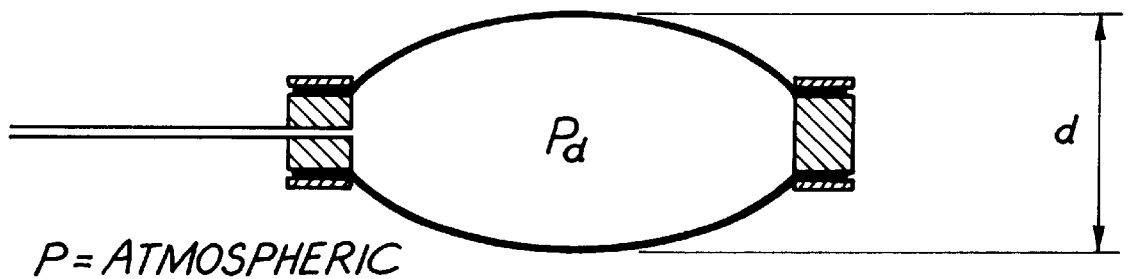
Figure 7:
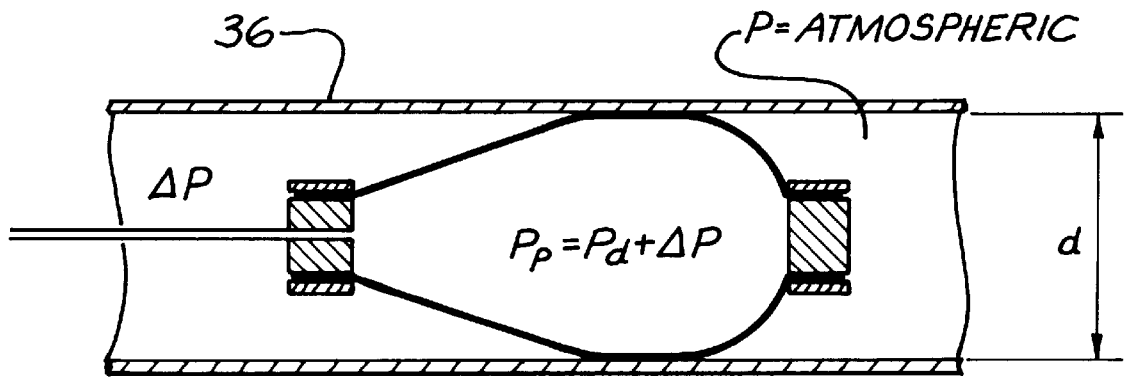

FIGS. 5 to 7 illustrate the parameters of the control method. FIG. 5 shows the unexpanded plug, with atmospheric pressure both inside and outside the plug. In FIG. 6 the plug is expanded to diameter d without a constraining tube, by application of the free expansion pressure $P_d$ to the inside of the plug. In FIG. 7 the plug is expanded inside a tube 36 of internal diameter d and the volume inside the tube upstream of the plug is pressurised to $\Delta P$. The minimum plug pressure, $P_p$, needed to maintain the pressure differential $\Delta P$ may be calculated is the sum of the free expansion pressure and the pressure differential.

The Applicant has found that, by controlling the internal pressure in the plug substantially according to the above equation, the tube pressure upstream of the plug can be controlled precisely as fluid will begin to leak past the plug at pressure differentials exceeding $\Delta P$. Controlling the plug pressure substantially according to the above equation is also particularly useful in applications where there is relative movement between the plug and the tube. In such applications, the retained fluid can be caused to flow past the surface of the plug forming a thin film, thus lubricating the relative movement and reducing friction forces on the outer surface of the plug.

The sensitivity of the control depends on the free expansion pressure of the plug. If this is very large, then a large plug pressure is required to effect a seal, which inhibits fine control of the system. It is desired therefore that the free expansion pressure be kept as low as possible, which object is achieved by the plug construction according to the first aspect of the invention.

For pressure control applications, a further important feature of such a plug relates to its length to diameter (L/D) ratio. It will be appreciated that the maximum expanded diameter of the plug occurs when the cords form a sphere. After this point is reached, further increases in pressure cannot result in a further increase in diameter. (With a pressure differential across the plug in fact, this point can never be reached). This therefore sets a lower limit on the length of the plug. As this lower limit is approached, the sensitivity of the plug decreases, that is, the free plug expansion pressure increases, and in the limit, to infinity. It would therefore seem desirable to have a very long plug. However, it has been discovered that a stability problem arises if the plug is too long, whereby the plug collapses progressively from the upstream to the downstream end, and the retained fluid is released in spurts. The critical upper L/D ratio depends on a number of factors, including the compliance of the pressurisation system (controlled by the volume and elasticity of pipe work and pumps, as well as the nature of the fluid being retained and the inflation fluid. For water, successful L/D ratios for the plug have been found below about 8:1.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A tube having located therein an inflatable plug for regulating pressure or flow within the tube, the inflatable plug comprising an inflatable bladder adapted for diametral expansion by application of internal fluid pressure, fluid inlet means communicating with the interior of the bladder for connection to a source of inflating fluid and reinforcement means including a plurality of flexible reinforcing cords which provide axial reinforcement to the plug and diametral support to the bladder, the improvement wherein each said reinforcing cord comprises a plurality of untwisted single strands which individually redistribute over the surface of the bladder as the bladder expands upon inflation towards an internal surface of the tube, whereby to allow controlled leakage past the plug of a lubricating flow of fluid within the tube.

2. The tube and inflatable plug according to claim 1, wherein the plug moves relative to the tube.

3. The tube and inflatable plug according to claim 1, wherein the plug moves relative to the tube.

4. The tube and inflatable plug according to claim 1, the improvement wherein said plug further comprises upstream and downstream end members at respective opposite ends of said bladder, at least one of said end members including said fluid inlet means and means for connection to an external support.

5. The tube and inflatable plug according to claim 1, the improvement wherein said plug has a length-to-diameter ratio of less than 8:1.

6. The tube and inflatable plug according to claim 1, the improvement wherein said reinforcing cords collectively form an envelope surrounding an outer surface of the bladder.

7. The tube and inflatable plug according to claim 6, the improvement wherein said reinforcing cords are closely positioned so as to substantially wholly support the outer surface of the bladder.

8. The tube and inflatable plug according to claim 7, the improvement wherein said plug further comprises a sheath outside said reinforcing cords.

9. The tube and inflatable plug according to claim 7, the improvement wherein said reinforcing cords extend between opposite axial ends of the bladder.

10. The tube and inflatable plug according to claim 9, the improvement wherein said reinforcing cords extend helically about said outer surface of the bladder.

11. The tube and inflatable plug according to claim 10, the improvement wherein said reinforcing cords extend at a helix angle of less than 15° to the axis of the plug.

12. The tube and inflatable plug according to claim 11, the improvement wherein said plug comprises at least two layers of cords extending in opposed helices.

13. The tube and inflatable plug according to claim 12, the improvement wherein said reinforcing cords are of substantially equal tension and length.

14. In an method of maintaining a desired pressure differential $\Delta P$ across an inflatable plug positioned within a tube of internal diameter d with relative movement between the plug and the tube, while allowing controlled leakage past the plug of a lubricating flow of fluid within the tube, the improvement which comprises inflating the plug by applying and maintaining an internal pressure $P_p$ in the plug substantially according to the equation $$P_p = \Delta P + P_d$$

wherein $P_d$ is the internal pressure required to expand the plug to tube diameter d without confinement.

15. In a method of maintaining a desired pressure differential $\Delta P$ across an inflatable plug positioned within a tube of internal diameter d, the improvement which comprises inflating the plug by applying and maintaining an internal pressure $P_p$ in the plug substantially according to the equation $$P_p = \Delta P + P_d$$

wherein $P_d$ is the internal pressure required to expand the plug to tube diameter d without confinement.

16. A tube having located therein an inflatable plug for regulating pressure or flow within the tube, the inflatable plug comprising an inflatable bladder adapted for diametral expansion by application of internal fluid pressure, fluid inlet means communicating with the interior of the bladder for connection to a source of inflating fluid and reinforcement means including a plurality of flexible reinforcing cords which provide axial reinforcement to the plug and diametral support to the bladder, the improvement wherein each said reinforcing cord comprises a plurality of untwisted single strands which individually redistribute over the surface of the bladder as the bladder expands upon inflating, toward the tube, whereby to allow controlled leakage past the plug of a lubricating flow of fluid within the tube, whilst maintaining a continuous coverage of the bladder so as to prevent cutting of the bladder by the cords.

17. The tube and inflatable plug according to claim 16, the improvement wherein said reinforcing cords extend between opposite axial ends of the bladder.

18. The tube and inflatable plug according to claim 16, the improvement wherein said reinforcing cords extend helically about said outer surface of the bladder.

19. The tube and inflatable plug according to claim 18, the improvement wherein said reinforcing cords extend at a helix angle of less than 15° to the axis of the plug.

20. The tube and inflatable plug according to claim 18, the improvement wherein said plug comprises at least two layers of cords extending in opposed helices.

21. The tube and inflatable plug according to claim 16, the improvement wherein said reinforcing cords are of substantially equal tension and length.

22. The tube and inflatable plug according to claim 16, the improvement wherein said plug further comprises upstream and downstream end members at respective opposite ends of said bladder, at least one of said end members including said fluid inlet means and means for connection to an external support.

23. The tube and inflatable plug according to claim 16, the improvement wherein said plug has a length-to-diameter ratio of less than 8:1.

24. The tube and inflatable plug according to claim 16, the improvement wherein said plug further comprises a sheath outside said reinforcing cords.

25. A tube having located therein an inflatable plug for regulating pressure or flow within the tube, the inflatable plug comprising an inflatable bladder adapted for diametral expansion by application of internal fluid pressure, fluid inlet means communicating with the interior of the bladder for connection to a source of inflating fluid and reinforcement means including a plurality of flexible reinforcing cords which cross each other in opposing helix directions around the bladder and which provide axial reinforcement to the plug and diametral support to the bladder, the improvement wherein each said reinforcing cord comprises a plurality of untwisted single strands which individually redistribute over the surface of the bladder as the bladder expands upon inflation towards an internal surface of the tube, to allow controlled leakage past the plug of a lubricating flow of fluid within the tube.

26. The tube and inflatable plug according to claim 25, the improvement wherein said reinforcing cords collectively form an envelope surrounding an outer surface of the bladder.

27. The tube and inflatable plug according to claim 25, the improvement wherein said reinforcing cords are closely positioned so as to substantially wholly support the outer surface of the bladder.

28. The tube and inflatable plug according to claim 25, the improvement wherein said reinforcing cords extend between opposite axial ends of the bladder.

29. The tube and inflatable plug according to claim 25, the improvement wherein said reinforcing cords extend at a helix angle of less than 15° to the axis of the plug.

30. The tube and inflatable plug according to claim 25, the improvement wherein said reinforcing cords are of substantially equal tension and length.

31. The tube and inflatable plug according to claim 25, the improvement wherein said plug further comprises upstream and downstream end members at respective opposite ends of said bladder, at least one of said end members including said fluid inlet means and means for connection to an external support.

32. The tube and inflatable plug according to claim 25, the improvement wherein said plug has a length-to-diameter ratio of less than 8:1.

33. The tube and inflatable plug according to claim 25, the improvement wherein said plug further comprises a sheath outside said reinforcing cords.

34. The tube and inflatable plug according to claim 25, wherein the plug moves relative to the tube.

35. A tube having located therein an inflatable plug for regulating pressure or flow within the tube, the inflatable plug comprising an inflatable bladder adapted for diametral expansion by application of internal fluid pressure, fluid inlet means communicating with the interior of the bladder for connection to a source of inflating fluid and reinforcement means including a plurality of flexible reinforcing cords which provide axial reinforcement to the plug and diametral support to the bladder, the improvement wherein a high number of fine, compliant strands are provided and which offer little or no resistance to diametral expansion of the bladder, upon inflation of the bladder towards an internal surface of the tube, to allow controlled leakage past the plug of a lubricating flow of fluid within the tube.

36. The tube and inflatable plug according to claim 35, the improvement wherein each said reinforcing cord comprises a plurality of untwisted strands.

37. The tube and inflatable plug according to claim 35, the improvement wherein said reinforcing cords collectively form an envelope surrounding an outer surface of the bladder.

38. The tube and inflatable plug according to claim 35, the improvement wherein said reinforcing cords are closely positioned so as to substantially wholly support the outer surface of the bladder.

39. The tube and inflatable plug according to claim 35, the improvement wherein said reinforcing cords extend between opposite axial ends of the bladder.

40. The tube and inflatable plug according to claim 35, the improvement wherein said reinforcing cords extend helically about said outer surface of the bladder.

41. The tube and inflatable plug according to claim 35, the improvement wherein said reinforcing cords extend at a helix angle of less than 15° to the axis of the plug.

42. The tube and inflatable plug according to claim 35, the improvement wherein said plug comprises at least two layers of cords extending in opposed helices.

43. The tube and inflatable plug according to claim 35, the improvement wherein said reinforcing cords are of substantially equal tension and length.

44. The tube and inflatable plug according to claim 35, the improvement wherein said plug further comprises upstream and downstream end members at respective opposite ends of said bladder, at least one of said end members including said fluid inlet means and means for connection to an external support.

45. The tube and inflatable plug according to claim 35, the improvement wherein said plug has a length-to-diameter ratio of less than 8:1.

46. The tube and inflatable plug according to claim 35, the improvement wherein said plug further comprises a sheath outside said reinforcing cords.

47. The tube and inflatable plug according to claim 35, wherein the plug moves relative to the tube.

\* \* \* \* \*